United States Patent [19]

Bergman et al.

[11] Patent Number: 4,663,130
[45] Date of Patent: May 5, 1987

[54] PROCESS FOR DISSOLVING TANTALUM/COLUMBIUM MATERIALS CONTAINING ALKALI METAL IMPURITIES

[75] Inventors: Roger M. Bergman, Sanatoga; Edwin J. Bielecki, Boyertown; Brian J. Higgins, Reading; Karl A. Romberger, Gilbertsville, all of Pa.

[73] Assignee: Cabot Corporation, Waltham, Mass.

[21] Appl. No.: 551,116

[22] Filed: Nov. 14, 1983

[51] Int. Cl.$^4$ .............................................. C01G 31/00
[52] U.S. Cl. ......................................... 423/68; 75/121
[58] Field of Search ....................... 75/121; 423/62, 68

[56] References Cited

U.S. PATENT DOCUMENTS

| | | | |
|---|---|---|---|
| 2,816,815 | 12/1957 | Ruhoff et al. | 423/62 |
| 3,658,511 | 4/1972 | Gustison | 75/121 |
| 3,972,710 | 8/1976 | Meyer | 75/121 |
| 4,309,389 | 1/1982 | Meyer | 423/62 |

Primary Examiner—L. Dewayne Rutledge
Assistant Examiner—S. Kastler
Attorney, Agent, or Firm—Robert J. Feltovic; Jack Schuman

[57] ABSTRACT

Disclosed is a process for dissolving tantalum and/or columbium-containing materials contaminated with alkali metal impurities. The tantalum and columbium materials are digested in a solution comprising hydrofluoric acid and a fluosilicate-containing compound. The alkali metals are reacted to form precipitated fluosilicates, which then can readily be separated.

18 Claims, No Drawings

PROCESS FOR DISSOLVING TANTALUM/COLUMBIUM MATERIALS CONTAINING ALKALI METAL IMPURITIES

Tantalum and columbium-containing materials such as ores, scrap materials, and the like, commonly are processed by digesting the materials in hydrofluoric acid to thereby form soluble tantalum and columbium fluorides. The tantalum and columbium are separated from each other and purified from associated metallic contaminants through liquid/liquid extraction techniques, using any suitable, water-immiscible, organic solvent, commonly methyl isobutyl ketone (MiBK).

The hydrofluoric acid solution is contacted with the ketone, and, by utilizing the principle that tantalum will extract from an aqueous hydrofluoric acid solution into the organic phase at a lower acidity than will the columbium, the tantalum and columbium are separated.

In commercial operations, it is economically desirable to maintain high concentrations of tantalum and/or columbium in the hydrofluoric acid solution in order to allow high production rates from the plant, as well as to lower the variable manufacturing costs (e.g., use less hydrofluoric acid and MiBK per pound of tantalum or columbium produced). For economical operation, tantalum oxide ($Ta_2O_5$) and/or columbium oxide ($Cb_2O_5$) concentrations in the digest solution are typically in the range of about 40 to about 100 g/L (kg/m$^3$) $Ta_2O_5$ and $Cb_2O_5$.

The tantalum and columbium-containing materials to be dissolved in hydrofluoric acid sometimes contain alkali metal contaminants, such as sodium and/or potassium. Such tantalum and columbium-containing materials typically may include, for example, such materials as recycled waste products from the sodium reduction of potassium fluotantalate, impure potassium fluotantalate, and various other Ta/Cb-containing materials with alkali metal impurities. When these contaminated materials are dissolved in hydrofluoric acid, the concentrations of the tantalum and columbium are limited by the presence of the alkali metals. For example, the low solubilities of such alkali metal compounds as sodium or potassium fluotantalates or many fluocolumbates cause these compounds to be lost due to precipitation.

Now, according to the present invention, it has been discovered that tantalum and/or columbium-containing materials contaminated with alkali metal impurities can be dissolved by a process comprising digesting the tantalum and/or columbium-containing materials in a hydrofluoric acid solution including a fluosilicate ($SiF_6^{-2}$-containing) compound to dissolve the tantalum and/or columbium and precipitate alkali metal fluosilicates. The precipitated alkali metal fluosilicates then can be separated from the dissolved tantalum and/or columbium.

Temperatures from ambient (about 25° C., 298° K.) up to the boiling point of the solution (about 100° C., 373° K., at standard pressure) typically are utilized; raising the temperature serves to increase solubilities and reaction rates. Preferably, the digestion is conducted at about 70° to 95° (343° to about 368° K.).

The fluosilicate may be introduced as any soluble fluosilicate compound during the initial ore digestion or any subsequent step in the process in which tantalum and/or columbium-containing materials are contacted with a hydrofluoric acid solution. Suitable compounds include fluosilicic acid ($H_2SiF_6$), ammonium fluosilicate [($NH_4)_2SiF_6$], magnesium fluosilicate ($MgSiF_6$), and the like. The fluosilicate also may be introduced by production in situ, i.e. by reaction of hydrofluoric acid with a silicon-containing material, such as quartz or any silicate mineral. Using quartz addition as an example, in situ formation of fluosilicic acid is illustrated by the following equation: $SiO_2 + 6HF \rightarrow H_2SiF_6 + 2H_2O$. Fluosilicic acid is preferred as the fluosilicate compound.

For purposes of illustration, using fluosilicic acid ($H_2SiF_6$) as the soluble fluosilicate compound and potassium fluotantalate ($K_2TaF_7$) as a tantalum-containing material, $K_2TaF_7$ reacts to produce soluble fluotantalic acid ($H_2TaF_7$) and precipitated potassium silicofluoride ($K_2SiF_6$), according to the mechanism outlined in the equations below:

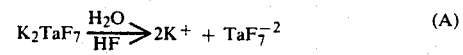  (A)

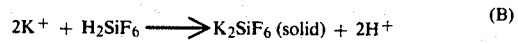  (B)

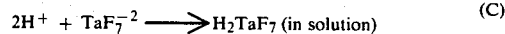  (C)

The precipitated potassium silicofluoride ($K_2SiF_6$) readily can be separated by conventional techniques, such as filtration. With or without preliminary filtration, the tantalum-containing solution may then be contacted with a suitable organic solvent whereby tantalum and columbium values are selectively extracted using conventional liquid/liquid extraction techniques.

The fluosilicate compound should be used in an amount sufficient to reach with all of the alkali metal contaminant present to precipitate alkali metal fluosilicates. Accordingly, at least about one equivalent of fluosilicate should be used per equivalent of alkali metal.

Any suitable, water-immiscible, organic solvent may be used to extract the tantalum and columbium values. Typical solvents include ketones, alcohols, ethers, aldehydes, and the like. Ketones, such as methyl isobutyl ketone, diethyl ketone, and the like are preferred; methyl isobutyl ketone is particularly preferred.

The following examples are provided to further illustrate the invention. The examples are intended to be illustrative in nature and are not to be construed as limiting the scope of the invention. All percentages given are by weight, unless otherwise indicated.

EXAMPLE I

A two liter (0.002 m$^3$) teflon beaker was fitted with an agitator comprising a polypropylene shaft and impellor connected to an electric motor, a teflon-covered copper heat exchanger coil, and a teflon-covered thermometer. To the beaker was added 0.4548 kg of deionized water (DI $H_2O$), 0.3743 kg of 49% by wt aqueous hydrofluoric acid (HF), and 0.335 kg of an aqueous 30% by wt fluosilicic acid solution ($H_2SiF_6$). While stirring the mixture, water was circulated through the heat exchanger coil to cool the mixture to below 30° C., and then 0.300 kg of tantalum (Ta)-containing waste from the sodium reduction of $K_2TaF_7$ (65.25% Ta, 4.5% Na, 7.9% K) was added slowly to the beaker over a period of about one hour (3600 seconds). The addition rate of the Ta-containing waste material was governed by the ability to maintain the temperature at less than 30° C. (303° K.) and to minimize foaming. After all of the tantalum material was added, the cooling water was disconnected and steam was introduced to the heat exchanger coil in order to heat the stirred mixture to 95° C. (368° K.) for about two hours (7200 seconds). Upon completion of reaction, the resulting slurry was cooled to less than 20° C. (293° K.) and then was filtered through a 10 micrometer membrane filter. The residue was washed by drawing a small quantity of 5% by wt aqueous HF solution through the filter cake; this was combined with the initial filtrate solution. The liquid volume and the tantalum content of the filtrate was measured; the amount of tantalum in the liquid phase then was calculated. The wet filter cake was dried at 120° C. (393° K.), the dry weight was measured, and the solids are analyzed for tantalum content. The percent of tantalum solubilization was calculated using the formula:

$$\left[1 - \left(\frac{\text{wt of Ta in digestion residue}}{\text{wt of Ta in tantalum material input}}\right)\right] \times 100.$$

The results are reported in Table A, below:

COMPARATIVE EXAMPLE II

A second run was made using the same equipment, Ta input material, and general procedure as outlined in Example I above. In this example, however, no fluosilicate was included in the digestion mixture.

The results are reported in Table A, below:

TABLE A

| | Example I | Comparative Example II |
|---|---|---|
| Digestion Mixture | | |
| 49% HF (kg) | .3743 | .3743 |
| 30% H$_2$SiF$_6$ (kg) | .335 | 0 |
| DI H$_2$O (kg) | .4548 | .6897 |
| Ta-containing Material (kg) | .300 | .300 |
| Ta Content (wt %) | 65.25 | 65.25 |
| Digestion Liquor Volume (m$^3$) | .900 × 10$^{-3}$ | .880 × 10$^{-3}$ |
| Ta content (g/L) (kg/m$^3$) | 209 | 109 |
| Digestion Residue (kg) | .1341 | .2074 |
| Ta content (wt %) | 9.1 | 45.6 |
| Ta Solubilized (wt %) | 94 | 52 |

As noted by a review of the table above, the digestion of the Ta-containing waste material in a hydrofluoric acid solution including fluosilicic acid accomplished solubilization of 94 percent of the tantalum content of the input material. Without the presence of fluosilicate in the digestion solution only 52 percent of the tantalum was solubilized.

EXAMPLE III AND COMPARATIVE EXAMPLE IV

Another set of runs were conducted using the same equipment and general procedures as outlined in Example I and Comparative Example II, above. Another typical Ta-containing waste sample from the sodium reduction of K$_2$TaF$_7$ (68.82% Ta, 1.77% Na, 5.3% K) was used as the tantalum-containing material input. In Example III, fluosilicic acid was added to the digestion mixture, while Comparative Example IV included no fluosilicate in the digestion mixture.

The results are listed below in Table B. It can be noted that the digestion of Example III, including fluosilicic acid in the digestion solution, achieved 99 percent solubilization of the tantalum present in the Ta-containing input material. This is compared with a 79 percent solubilization in a digestion without fluosilicate present, in comparative Example IV.

TABLE B

| | Example III | Comparative Example IV |
|---|---|---|
| Digestion Mixture | | |
| 49% HF (kg) | .3743 | .3743 |
| 30% H$_2$SiF$_6$ (kg) | .335 | 0 |
| DI H$_2$O (kg) | .454 | .6897 |
| Ta-containing Material (kg) | .300 | .300 |
| Ta Content (wt %) | 68.82 | 68.82 |
| Digestion Liquor Volume (m$^3$) | .960 × 10$^{-3}$ | 1.115 × 10$^{-3}$ |
| Ta content (g/L) (kg/m$^3$) | 222 | 152 |
| Digestion Residue (kg) | .0753 | .1142 |
| Ta content (wt %) | 3.7 | 39.05 |
| Ta Solubilized (wt %) | 99 | 79 |

EXAMPLE V AND COMPARATIVE EXAMPLE VI

Again using the same equipment and general procedure as outlined in Example I, a run was made using a potassium fluotantalate sample (K$_2$TaF$_7$) as tantalum-containing material input. Fluosilicic acid was added to the digestion mixture. The results, featuring 99 percent of the input Ta solubized, are reported in Table C, below. By comparison, if no fluosilicate is added to the digestion mixture, as shown in comparative Example V, the weight percent of tantalum solubilized is only about 7 percent.

TABLE C

| | Example V | Comparative Example VI |
|---|---|---|
| Digestion Mixture | | |
| 49% HF (kg) | .0387 | .0387 |
| 30% H$_2$SiF$_6$ (kg) | .1286 | 0 |
| DI H$_2$O (kg) | .190 | .315 |
| Ta-containing material (kg) | .100 | .100 |
| Ta Content (wt %) | 46.7 | 46.7 |
| Digestion Liquor Volume (m$^3$) | .355 × 10$^{-3}$ | .355 × 10$^{-3}$ |
| Ta content (g/L) (kg/m$^3$) | 134.1 | 9 |
| Digestion Residue (kg) | .0542 | .0929 |
| Ta content (wt %) | 0.5 | 46.7 |
| Ta Solubilized (wt %) | 99 | 7 |

Similar digestion runs using various sources of fluosilicate exhibit comparable results to those reported above wherein fluosilicic acid was included in the digestion mixture. These other sources of fluosilicate include the in-situ generation of (SiF$_6^{-2}$) by the addition of quartz or a silicate material to the digestion solution, as well as the addition of ammonium fluosilicate and/or magnesium fluosilicate. The above examples have reported tantalum solubilization; columbium-containing input materials dissolved in similar digestion mixtures produce comparable increases in solubilization of Cb by including fluosilicate in the digestion mixture, according to the present invention.

The embodiments of the invention in which exclusive property or privilege is claimed are defined as follows:

1. A digestion process for the recovery of tantalum and/or columbium values, wherein the improvement comprises: dissolving tantalum and/or columbium-containing materials, contaminated with alkali metal impurities, in a hydrofluoric acid solution containing a fluorosilicate compound in an amount sufficient to react with said alkali metal impurities to precipitate alkali metal fluosilicates.

2. The process of claim 1 wherein the fluosilicate compound is used in an amount of at least about one equivalent of fluosilicate per equivalent of alkali metal impurity.

3. The process of claim 1 wherein the fluosilicate compound is fluosilicic acid.

4. The process of claim 1 wherein the fluosilicate compound is ammonium fluosilicate.

5. The process of claim 1 wherein the fluosilicate compound is magnesium fluosilicate.

6. The process of claim 1 wherein the tantalum-containing material is tantalum-containing waste from the sodium reduction of potassium fluotantalate.

7. The process of claim 1 wherein the tantalum-containing material is potassium fluotantalate.

8. The process of claim 1 wherein the fluosilicate compound is generated in-situ in the hydrofluoric acid solution by the addition of a silicon-containing material to said solution.

9. The process of claim 1 wherein the tantalum and-/or columbium-containing materials are dissolved in a hydrofluoric acid solution at a temperature ranging from about 70° to about 95° C. (343° to about 368° K.).

10. A process for dissolving tantalum and/or columbium-containing materials contaminated with alkali metal impurities comprising: dissolving the tantalum and/or columbium-containing materials in a hydrofluoric acid solution containing a fluosilicate compound in an amount sufficient to react with the alkali metal impurities to precipitate alkali metal fluosilicates.

11. The process of claim 10 wherein the fluosilicate compound is used in an amount of at least about one equivalent of fluosilicate per equivalent of alkali metal contaminant.

12. The process of claim 10 wherein the fluosilicate compound is fluosilicic acid.

13. The process of claim 10 wherein the fluosilicate compound is ammonium fluosilicate.

14. The process of claim 10 wherein the fluosilicate compound is magnesium fluosilicate.

15. The process of claim 10 wherein the tantalum-containing material is tantalum-containing waste from the sodium reduction of potassium fluotantalate.

16. The process of claim 10 wherein the tantalum-containing material is potassium fluotantalate.

17. The process of claim 10 wherein the fluosilicate compound is generated in-situ in the hydrofluoric acid solution by the addition of a silicon-containing material to said solution.

18. The process of claim 10 wherein the tantalum and/or columbium-containing materials are dissolved in a hydrofluoric acid solution at a temperature ranging from about 70° to about 95° C. (343° to about 368° K.).

* * * * *